MEMORY ASSEMBLY EMPLOYING APERTURED PLATES

Filed Jan. 7, 1960 4 Sheets-Sheet 1

INVENTOR.
WILLIAM E. NEWMAN
BY John V. Regan
ATTORNEY

MEMORY ASSEMBLY EMPLOYING APERTURED PLATES

Filed Jan. 7, 1960 4 Sheets-Sheet 2

INVENTOR.
WILLIAM E. NEWMAN
BY John V. Regan
ATTORNEY

INVENTOR.
WILLILLIAM E. NEWMAN
BY John V. Regan
ATTORNEY

INVENTOR.

WILLIAM E. NEWMAN

BY John V. Regan

ATTORNEY 3,171,102

MEMORY ASSEMBLY EMPLOYING APERTURED PLATES

William E. Newman, Moorestown, N.J., assignor to Radio Corporation of America, a corporation of Delaware Filed Jan. 7, 1960, Ser. No. 977
10 Claims. (Cl. 340—174)

The present invention relates to apertured ferrite memory plates and particularly to a new and improved memory module employing such plates.

An object of the invention is to provide a very compact memory plate assembly which is capable of storing a relatively large number of bits of information.

Another object of the invention is to provide a memory module employing apertured ferrite plates which can be relatively quickly assembled.

Yet another object of the present invention is to provide an easily assembled memory module in which each memory plane consists of several apertured plates.

The memory module of the invention includes a supporting base and alignment rods fixed to the base and extending at substantially right angles therefrom. Slidably mounted on the rods and parallel to one another are a plurality of substantially identical holders formed of non-magnetic material. Each holder is formed with a plurality of cut-outs. A thin insulator spacer formed with cut-outs for the plates may be located between each holder. An apertured ferrite memory plate is located in each cut-out in each holder. A spring maintains the holders and insulating spacers in resilient engagement. Column and row control wires extend through aligned apertures in the plates.

The holder for the memory plates in each plane is in itself new. The cut-outs in each holder are formed with inwardly extending lips at the edges of the cut-outs for supporting the memory plates. Preferably, the plates and cut-outs are square and the cut-outs are symmetrically arranged. The holder is formed with a groove in one of its surfaces joining one diagonally opposite pair of cut-outs and another groove in the opposite surface joining the other diagonally opposite pair of cut-outs. Wires leading to the printed circuit on each apertured memory plate lie in the two grooves and are insulated from each other by the holder. These wires can easily be soldered prior to the time the plates are placed in the cut-outs and this is an important advantage as will be discussed later.

The invention will be described in greater detail by reference to the following description taken in connection with the accompanying drawing in which:

FIGS. 1*a* and 1*b* are front and back views, respectively, of the same portion of an apertured ferrite memory plate;

Figure 6:
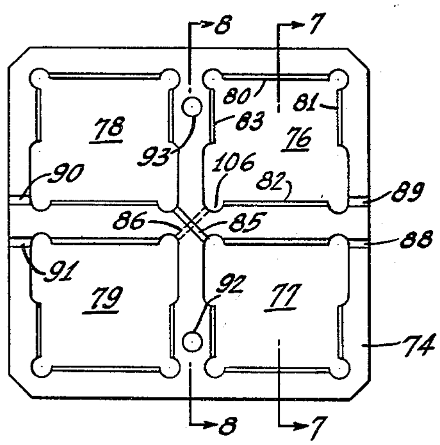
FIG. 6 is a plan view of a four plate holder according to the present invention.
Figure 7:
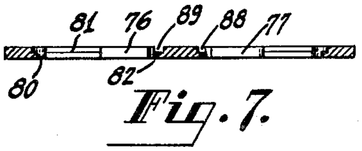
Figure 8:
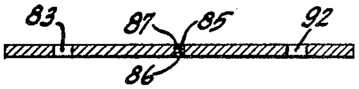

FIGS. 7 and 8 are sectional views along lines 7—7 and 8—8, respectively, of the holder of FIG. 6.

Figure 9:
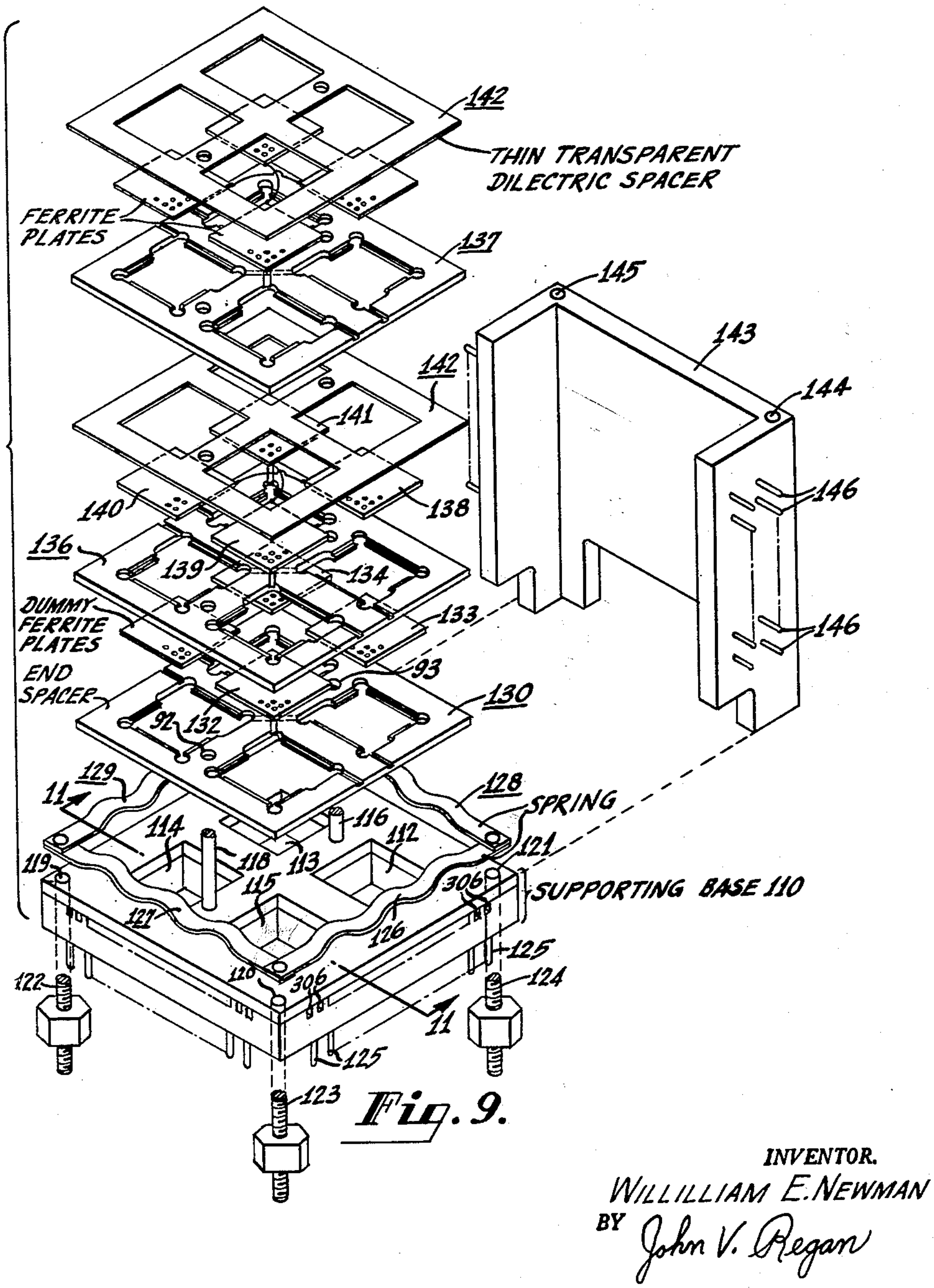
Figure 10:
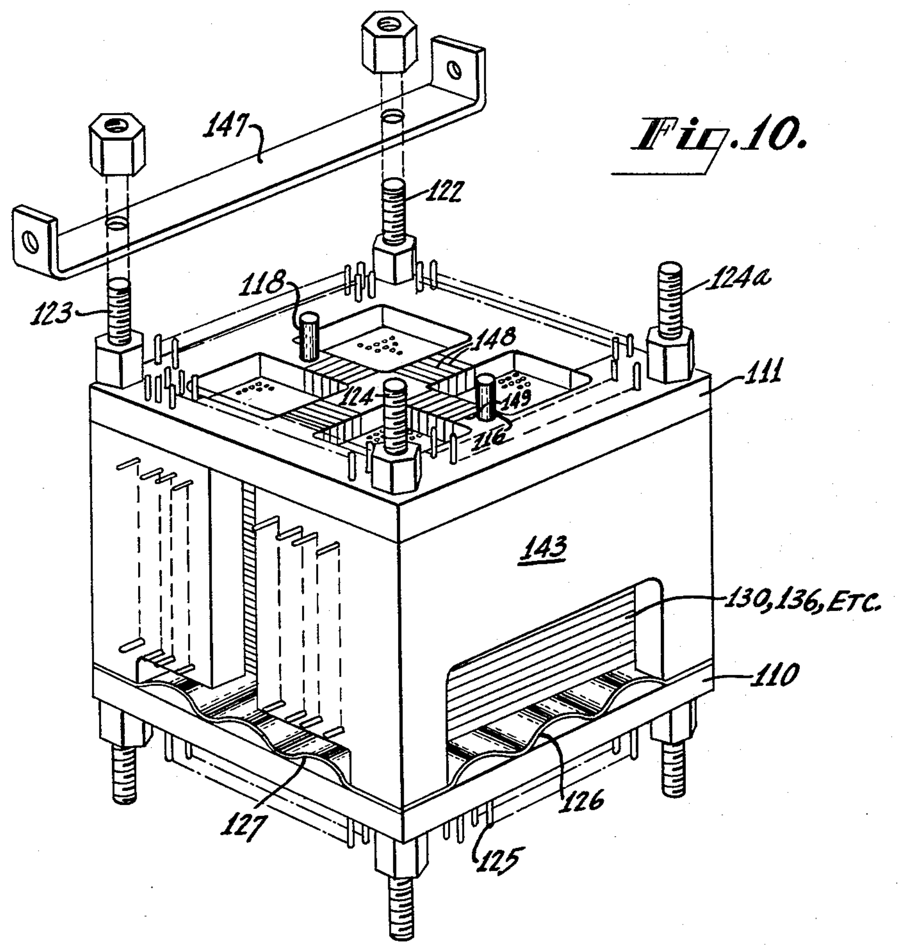
Figure 11:
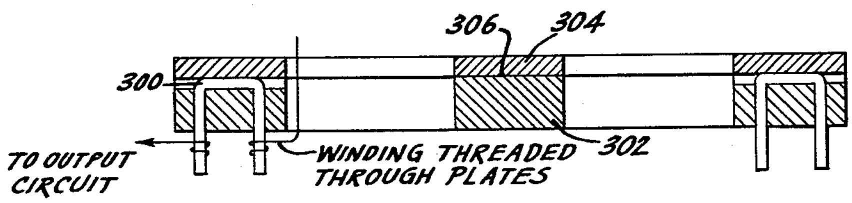

FIG. 9 is an exploded, perspective view of a portion of a memory module according to the present invention;

FIG. 10 is a perspective view of a memory module according to the present invention; and FIG. 11 is a cross-section along line 11—11 of FIG. 9.

Apertured ferrite memory plates are known in the art and are described in some detail in an article by Rajchman in Proceedings of the IRE, March 1957, page 325. Front and back views of the same portion of one plate are shown in FIG. 1. The plate may be made of a ferrite or other square loop magnetic material. One type of plate is formed with crossed-raised ridges 30 and apertures between the ridges. A conductive coating such as one formed of copper is plated or otherwise deposited on both sides of the plate. This conductor is then removed from the raised ridges to form the structure shown in FIG. 1. The conductive coating adheres on all surfaces of the plate including the inner edges of the apertures. This coating forms a printed circuit winding which starts at one corner of the plate and threads through each aperture from surface to surface of the plate to another corner of the plate. For example, if the input lead is as shown at 32, the printed circuit winding extends from 32 through aperture 34 to the front surface of the plate, then through aperture 36 to the back surface of the plate, then along the back surface to aperture 38 and through aperture 38 to the front surface of the plate, and so on.

Figures 1A, 1B, 2, 3:
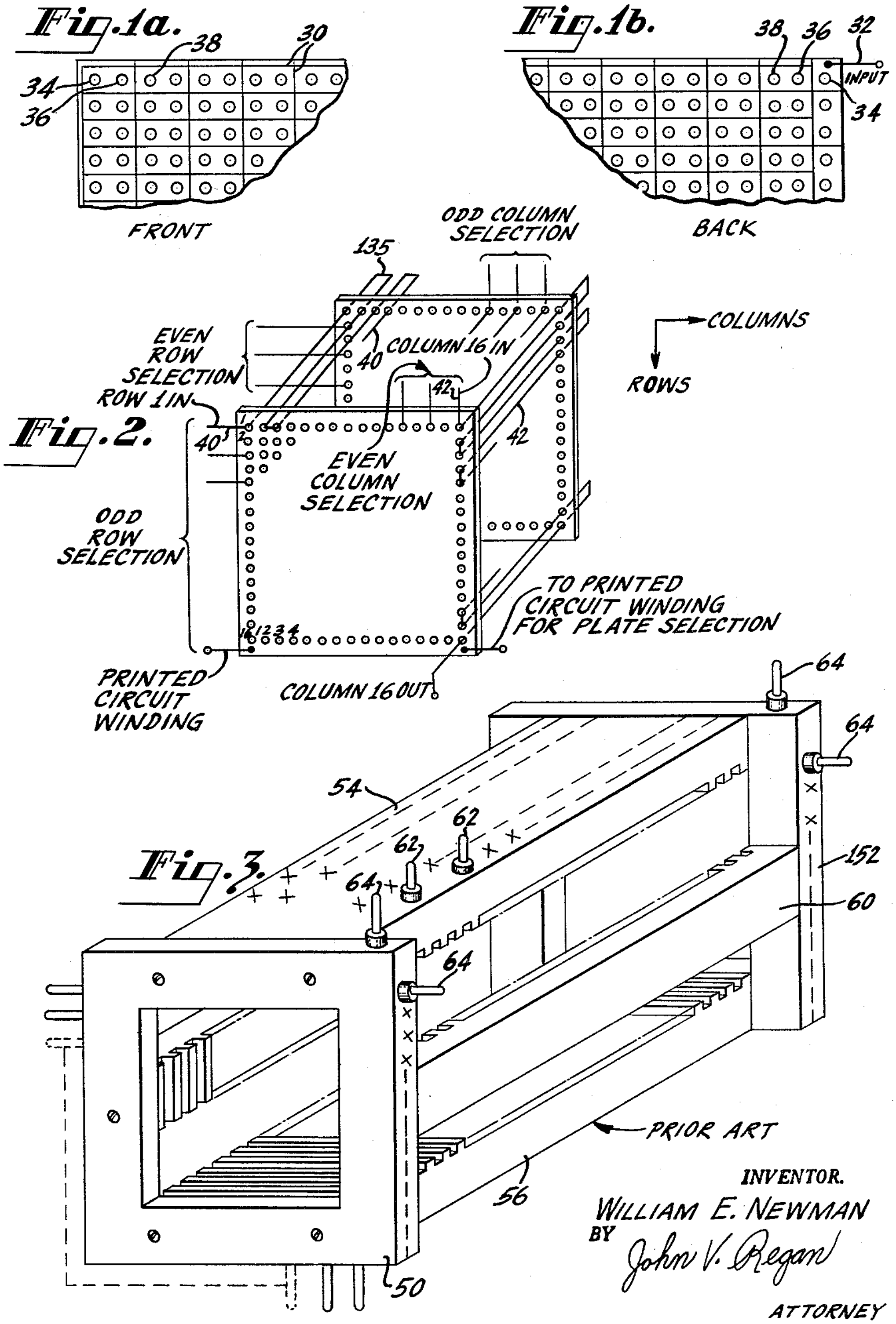
FIG. 2 is a diagrammatic, perspective view of an assembly of apertured memory plates.
FIG. 3 is a perspective view of a prior art jig for holding memory plates both during the time they are being wired and when they are being used as a memory module.

A memory employing ferrite plates may be wound as shown in FIG. 2, for example. Each plate may have 16 x 16 apertures. Only two plates are shown in FIG. 2 but in practice there may be many more than two. In order to select one particular aperture, three windings are required since the memory is a three dimensional structure. One of the windings is the printed circuit winding and it selects the plate which contains the desired aperture. A second winding is a wire which passes through all the apertures in one row. One such "row selection" wire is shown in part at 40 in FIG. 2. The third winding is a wire which selects the column containing the desired aperture and one of these "column selection" wires is shown in part at 42.

During a write operation, there may be applied to the printed windings on certain of the plates separate inhibit pulses. Concurrently, there may be applied to the wire for the row containing the desired aperture a first input pulse and to the wire for the column containing the desired aperture a second input pulse. The concurrent application of two pulses of the same sense to a selected aperture of a plate at the same time that the inhibit pulse is absent from the printed winding of that plate, produces a magnetic flux around the selected aperture in a desired direction. This desired direction may represent storage of the binary digit one, for example. No flux change is produced in those plates which also receive the inhibit pulses. During the read operation, first and second pulses of opposite polarity are applied to selected column and row wires. No pulses are applied to the printed windings and instead these windings serve, during the read operation, as sensing windings. At the end of the read operation, the flux direction around each selected aperture is in the opposite direction and corresponds to storage of the binary digit zero. Other suitable modes of operating a three dimensional memory may be used.

The memory shown in FIG. 2 is very compact and is capable of storing a large number of bits. However, since the apertures are very small and are relatively closely spaced, there is a problem of how to string the row and column selection wires through the apertures. Note that two wires must be threaded through each aperture. Moreover, it is sometimes desired in certain applications to use more than one memory plate for each plane in the memory. It may be desired, for example, to use four plates per plane or even 16 plates per plane. It is difficult to construct a memory module employing four or more plates per plane as will be explained in greater detail later.

FIG. 3 illustrates a prior art jig for assembling memory plates. The jig consists of two end members 50 and 52 to which are fastened upper and lower grooved supports 54 and 56, and two side grooved supports 58 and 60. A plurality of terminals, some of which are shown at 62 are fixed to the upper grooved support 54 and a plurality of terminals, some of which are shown at 64, are fixed to the end members 50 and 52. Wires from the printed circuits on the ferrite plates may be fastened to terminals 62 and the row and column selection windings may be fastened to terminals 64.

In order to assemble a memory module, one of the side supports such as 60 is removed and the memory plates are slid into the grooves in the supports 54, 56, 58. The side support 60 is then refastened so that the plates are held fairly securely. The row and column windings are then threaded through the apertures in the memory plates by means of a hollow needle, sometimes referred to as a tubular shuttle. The wires are first threaded through the needle and the needle is then passed through aligned apertures in the memory plates.

In practice, assembling a memory module in the way described above has not proved to be entirely satisfactory. It has been found that the grooves must be machined with a certain amount of clearance in order to allow the memory plates easily to be slid into place. This clearance allows the plates to shift in position and the apertures to thereby become slightly mis-aligned. Moreover, it may be observed that there are four grooved supports, each connected at its two ends by screws to the end members. The accumulated tolerances are such that plates and the apertures in the plates tend to become mis-aligned. In addition, there is certain amount of twist which is possible between the ends of the assembly and this also adds to the alignment problem. The shifting of the plates makes it exceedingly difficult to thread the row and column selection windings through the apertures in the plates.

Figure 4:
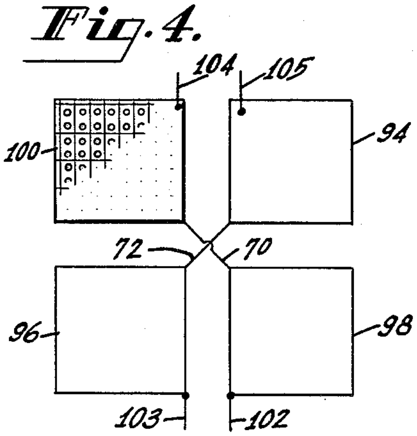
FIG. 4 is a diagrammatic view of a desired memory plane configuration consisting of four apertured memory plates.

As previously mentioned, in some forms of memories four plates per plane are needed and in others perhaps sixteen plates per plane are needed. In any of these applications, it is necessary to fasten the leads going to the printed circuit together. An arrangement of four such plates is shown in FIG. 4. Apertures and ridges are shown in only one of the plates, however, it is to be understood that they are present in all plates both in this figure and in FIG. 5. The preferred way to fasten the leads is as shown. The diagonally opposite plates are connected together by short leads of the same length 70 and 72. The reason that short leads are desired is to reduce the lead capacitance. The reason they are the same length is to make the capacitances introduced equal.

With a memory plate assembly such as shown in FIG. 3, it is very difficult to make up a module having four plates per plane as shown in FIG. 4 or more than four plates per plane. The reason is the difficulty of soldering together the short leads to plates 94 and 96 to form lead 72 and the coresponding leads to plates 98 and 100 to form lead 70. After the leads for the four end ones of the plates are soldered, the soldering iron cannot easily be placed in position to solder the leads for the remaining memory plates.

Figure 5:
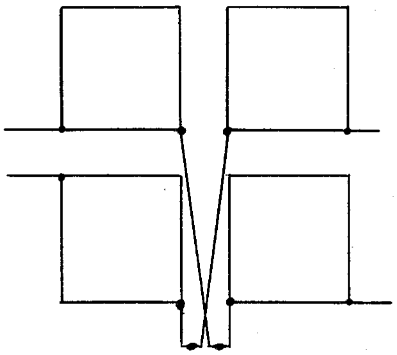
FIG. 5 is a diagrammatic view of another four plate memory plane assembly.

The four memory plates may be connected together as shown in FIG. 5. The leads would then be easy to get at. However, this assembly method is not entirely suitable as the lead lengths are longer than they should be and introduce an undesired amount of distributed capacitance.

A holder for four memory plates according to the present invention is shown in FIGS. 6–8. The holder 74 is formed of a non-magnetic, insulator material adapted to the manufacturing method to be employed. For example, if the holders are to be molded, materials such as nylon, Bakelite or any other suitable thermoplastic may be used. If the holders are to be machined, a commerically available fabric base nylon sheet material is especially suitable. It has low moisture absorption and good dielectric properties. Many other free machining dielectric materials are also suitable.

Four symmetrically arranged cut-outs 76–79, each with inwardly extending lips 80, 81, 82, and 83 are formed in the holder. These cut-outs and lips are for the memory plates. The shape of the cut-outs is the same as that of the plates—square in the present case, however, if the plates are rectangular, the cut-outs are rectangular and so on. A groove 85 is formed in the upper surface of plate 74 and it joins diagonally opposite cut-outs 77 and 78. A second groove 86 is formed in the lower surface of holder 74 and it joins diagonally opposite cut-outs 76 and 79. The grooves are sufficiently shallow so that a small amount of insulating material 87 remains between the grooves where they cross. These grooves are for leads 70 and 72 (FIG. 4). Four additional grooves 88–91 are formed in the upper surface of holder 74, one extending from each cut-out, as shown. These are for the leads 102–105 (FIG. 4). Apertures 92 and 93 are for the purpose of aligning the various holders making up a memory module as will be explained in connection with FIG. 9.

If the holders are molded, all cut-outs, grooves, lips and apertures are formed during the molding step. If the holders are machined, a technique used for small production runs, a contour milling machine may be used. A templet is made up which may be five or more times the size of the holder to be machined to gain accuracy in the part produced. A stylus which is mechanically coupled to the machine bit follows the oversize templet and cuts the templet pattern into the work piece. The holder of FIG. 6 can be made by this method at a cost of about $1.00, whereas if hand machining were used, the cost would be about $15.00 per holder. With mass production molding techniques, the cost can, of course, be reduced to substantially less than $1.00 per holder.

In making up a memory plane, the leads from diagonally opposite plates 94, 96 may be soldered together to form lead 72, and the leads from diagonally opposite plates 98, 100 may be soldered together to form lead 70, as shown in FIG. 4, before the plates are placed in the holder. The plates are then placed in the cut-outs. Plates 94 and 96 (FIG. 4), for example, fit into cut-outs 77 from the top and 78 and the lead 72 then fits into groove 85. The plates rest on the upper surfaces of the lips. Plates 98 and 100 are placed into cut-outs 79 and 76 by passing them through the cut-outs from the bottom of the holder, as viewed in FIG. 6. This can be done by tilting the plates slightly and moving them into the cut-outs on edge and, after they have passed through the cut-outs, placing them on the supporting lips 80–83. The lead 70 joining plates 98 and 100 then pulls into the lower groove 86. The input and output leads 102–105 (FIG. 4) fit into grooves 91–88.

The plate holder above has important advantages. For example, it is now possible to solder together the leads of the plates in a memory plane before the memory module is assembled. These leads may be made as short as desired and the leads can be of the same length so that the capacitance introduced by each is the same. These leads lie in grooves 84 and 86 which effectively insulate the leads from one another. The leads 70 and 72 are soldered to the conductive coating on the memory plates and this leaves a thin film of solder on each plate which bonds the lead to the edge of the plate. The design of the lips on the holder is such that there is adequate clearance for the solder as, for example, in area 106.

Another advantage resides in the cut-out design. The memory plates can be placed into the cut-outs from the top or bottom, as described, and need not be slid into grooves as in the prior art. Thus, in the present memory assembly, thickness variation in the ferrite plates causes no difficulties, whereas in the prior art memory, the slots (FIG. 3) have to be wide enough for the thickest ferrite plate. Accordingly, in the prior art memory there is much more room for shifting of the plates than in the present memory. It has also been found possible to mold the cut-outs (FIG. 6) to closer tolerances than the slots (FIG. 3). The reason is that the slotted supports of the jig of FIG. 3 tend to warp in the molding process.

The alignment of the plates in the holders is also improved in the present memory. The alignment means consists of only two fixed pins which pass through alignment apertures 92 and 93. This leads to far fewer accumulated dimensional variations in the system than in the prior art jig in which there are a much larger number of screws holding a much larger number of slotted supporting elements.

A final advantage is that the holder can easily be expanded to hold many more than four plates such as 16, or 64 without introducing complications.

An exploded, perspective view of a portion of a memory module is shown in FIG. 9. The supporting base 110 is formed with four cut-outs 112–115 which are of roughly the same size as the cut-outs in the plate holders. Two alignment pins which are shown in broken away view at 116 and 118 are imbedded in the base and extend at right angles from it. These pins fit through the alignment apertures 92 and 93 (FIG. 6) in each of the plate holders. Four apertures, only three of which 119, 120, and 121, appear in FIG. 9, are located at the four corners of the supporting base. These are for the four bolts, only three of which 122, 123, and 124, are shown in FIG. 9, which hold the memory module together. A plurality of terminals, some of which are shown at 125, are fixed to the lower surface of the base 110 and the upper surface of the corresponding end support 111 (FIG. 10). The row and column windings which pass through the apertured plates are fixed to various ones of these terminals. Other of these terminals lead from the row and column winding terminals to external circuits.

A more detailed showing of the terminals appears in FIG. 11 which is a cross-section along line 11—11 of FIG. 9. The terminals themselves are U-shaped and one of them is shown at 300. The supporting base in which the terminal is imbedded is made up of two parts, a terminal board 302 and a backup plate 304. During the manufacturing process, parallel grooves are machined or molded in the terminal board. These may be seen in end view in FIG. 9 at 306.

In order to assemble the supporting base with terminals, the terminal board and backup plate are first separately molded or machined. The U-shaped terminal pins are then inserted in the holes and grooves, the grooves being of the correct depth so that the back of the U does not extend beyond the back surface 306 of the terminal board. An adhesive is then applied and the backup plate 304 is placed over the terminals. Alternatively, the backup plate 304 may be riveted or otherwise fastened to the terminal board 302. This method of assembling the supporting base and end terminals is much cheaper than molding the terminals as inserts in the supporting base. The latter process would require that each terminal be in place prior to closing the mold. The assembly cycle of inserting terminals in the mold would hold up the mold about ten times longer than the molding cycle.

Four springs 126–129 rest on the upper surface of the base. Their purpose is to resiliently hold together the plate holders, plates and insulator spacers.

Above the springs is an end spacer 130 which may be exactly like the holder 74 shown in FIG. 6. Located within the four cut-outs in the end spacer are four ferrite dummy memory plates 131–134. These plates, unlike the plates which store information, do not have a printed winding conductive coating. The row and column wires which are threaded through the ferrite memory plates above the dummy plates pass through the apertures in the dummy plates and are bent around the lower surface of the dummy plates so that they can be threaded back through the apertures. In other words, these wires are folded back as is indicated at 135 in FIG. 2, for example. It has been found that if ferrite plates which have a conductive coating on them are used as the end plates, the sharp bend 135 in the wire may cause the very thin insulation on the wire to crack or otherwise to wear, and a short circuit to occur between the wire and the conductive coating. This does not occur when the dummy plates are used as the end plates as they do not have a conductive coating.

A second holder 136 for ferrite plates is located above and immediately adjacent to holder 130. This holder is also identical with the one shown in FIG. 6. The lower edges of the inwardly extending lips in each cut out are located immediately adjacent to the outer edges of the dummy ferrite plates so that the latter are held fairly rigidly in place. In like manner, the lips on the cut-outs in the holder 137 immediately above holder 136 hold the ferrite plates 138–141 in place.

A ferrite plate is located in each cut-out in holder 136. Above the ferrite plate is a thin, transparent, dielectric spacer 142. It may be formed of an insulator material such as Mylar (a commercially available polyester film), or other thin sheet electrical insulating material. The purpose of the spacer is to prevent a cross-soldered lead (such as 70, FIG. 4) in one memory plane from shorting to a cross-soldered lead (such as 72, FIG. 4) in the next adjacent plane. However, these leads are insulated leads and if the soldering is carefully done, that is, if the solder does not project beyond the groove, or, if the soldered connection is coated with an insulator, the dielectric spacers may be omitted.

The structure subsequently repeats itself, that is, dielectric spacer, holder with plates, etc., until the desired number of plates are in place. For example, the entire structure may be made up of 32 memory planes or a total of 128 plates. The upper end support is not shown in FIG. 9 but may be similar to the lower one. One of the side members is shown at 143. It includes apertures 144 and 145 at the outer corners through which the bolt 124 and another bolt pass. Terminals, some of which are shown at 146, are located in the opposite short sides of the side members. The input and output leads for the printed circuits on the ferrite plates are soldered to these terminals.

A perspective view of a memory module made up of four ferrite plates per memory plane is shown in FIG. 10. Elements similar in function and structure to those shown in exploded view in FIG. 9 are legended with the same reference numerals. In addition, a mounting bracket is shown at 147. Its purpose is to permit several four plate per plane memory modules to be mechanically connected together. Thus, for example, if it is desired to make up a memory with 16 plates per plane, four such modules can be interconnected. Normally there are two brackets such as shown at 147 for the upper ends of the four bolts 122, 123, 124, 124*a* and two brackets for the lower ends of these bolts.

The module shown in FIG. 10 is assembled in a manner similar to that described previously. A hollow needle is threaded through aligned apertures and column and row wires are passed through the needle. The needle is then pulled through the aligned apertures and the row and column wires are tightened. Row and column wires linking adjacent memory plates pass over the upper and lower end supports 110 and 111 and are shown at 148 and 149, for example. The alignment pins pass through the entire assembly and extend through the upper end support 111. The springs 126 and 127 resiliently hold the plate holders together.

A four plate per plane memory has been built with jigs like that shown in FIG. 3, but the memory was only five plates deep. It was found to be impractical if not impossible to make the memory deeper than this. The four plate per plane memory of FIG. 10 may be made as deep as desired without major alignment problems. A 128 plate memory module such as shown in FIG. 10 can be assembled and strung by hand in roughly the same time as required to make up a 32 plate memory module (single plate per plane) with the jig of FIG. 3.

What is claimed is:

1. A holder for apertured memory plates comprising a non-magnetic member formed with cut-outs, each cut-out slightly larger in size than a plate, inwardly extending lips on the edges of each cut-out for supporting a plate, and said member being formed with one groove in one surface of said member joining one pair of opposite cut-outs at a point where they are closely spaced and another groove in the opposite surface of said member joining another pair of opposite cut-outs at a point where they are closely spaced.

2. A holder for apertured memory plates comprising, a non-magnetic member formed with four side-by-side symmetrically spaced cut-outs, each slightly larger in size than the plate, inwardly extending lips on the edges of said cut-outs for supporting said plates, and said member being formed with a pair of grooves, one in each surface of the member, one groove joining one diagonally opposite pair of cut-outs and the other joining the other diagonally opposite pair of cut-outs.

3. An arrangement for stacking apertured memory plates comprising, in combination, a plurality of non-magnetic insulator members, each formed with a plurality of substantially identically spaced cut-outs, each cut-out slighty larger in size than a plate, each member being also formed with inwardly extending lips on the edges of said cut-outs for supporting said plates; a supporting member; and alignment rods fixed to said supporting member and extending at right angles therefrom, said insulator members each being formed with alignment apertures, and said alignment rods engaging said apertures.

4. A memory comprising, in combination, a supporting base; alignment rods fixed to the base and extending at right angles therefrom; a plurality of substantially identical non-magnetic plate holders, each formed with a plurality of cut-outs for receiving apertured memory plates, all said members being slideably mounted on said rods parallel to one another and to said base; an apertured memory plate in each cut-out; an insulator spacer formed with cut-outs for said plates located between each member; spring means for maintaining said members and insulator spacers in resilient engagement; and wires extending through aligned apertures in said plates.

5. In a memory as set forth in claim 4, each plate holder being formed with square, symmetrically arranged cut-outs for holding said plates, and with a groove in one surface thereof joining two diagonally opposite cut-outs at their point of closest spacing; and a groove in the opposite surface thereof joining the other, diagonally opposite cut-outs at their point of closest spacing.

6. In a memory as set forth in claim 4, said supporting base comprising a plurality of U-shaped conductive terminals; a first insulator member formed with a like plurality of pairs of holes extending through the member for the ends of the U's and grooves in one surface of the member joining each said pair of holes for the bases of the U's, said terminals being in place in the holes and grooves; and a second insulator member secured to the first over the grooves for holding the terminals in place.

7. In a memory module for apertured, ferrite plates, a plurality of holders, each formed with a plurality of cut-outs in which the memory plates fit, said holders being stacked one above the other with the plates in alignment, and lips at the inner edges of each cut-out which serve the dual purpose of supporting the memory plate in that cut-out, and applying force to the edges of the plate in the next adjacent holder for keeping the latter plate in place.

8. In combination, a plurality of apertured memory plates; and a holder comprising a non-magnetic insulator member formed with cut-outs, each cut-out slightly larger in size than one of said apertured memory plates, inwardly extending lips on the edges of each cut-out for supporting one of said plates, said member being formed with one groove in one surface of said member joining one pair of opposite cut-outs at a point where they are closely spaced and a second groove on the opposite surface of said member crossing the first groove but being insulated therefrom by the material of which the non-magnetic member is formed which remains between the two grooves where they cross, said second groove joining another pair of opposite cut-outs at a point where they are closely spaced, said apertured memory plates being located in said cut-outs, one plate per cut-out.

9. In combination, a holder comprising a non-magnetic insulating member formed with four side-by-side cut-outs arranged in a two-by-two matrix, each cut-out slightly larger in size than an apertured memory plate, inwardly extending lips on the edges of said cut-outs for supporting said plates, and said member being formed with a pair of grooves, one in each surface of the member, one groove joining one diagonally opposite pair of cut-outs and the other joining the other diagonally opposite pair of cut-outs, said grooves being spaced from one another by the insulating member where the two grooves pass over one another; and four apertured memory plates, one located in each cut-out, two diagonally located plates being joined to one another by a wire in one of the grooves and the other two diagonally opposite plates being joined to one another by a wire in the other groove.

10. In combination, a holder comprising a relatively stiff non-magnetic insulating member formed with cut-outs, each cut-out slightly larger in size than a memory plate and inwardly extending lips on the edges of each cut-out for supporting a plate; and substantially inflexible apertured memory plates located one in each said cut-out and supported by said inwardly extending lips on the edges of the cut-outs.

References Cited in the file of this patent

UNITED STATES PATENTS

| | | |
|---|---|---|
| 2,092,466 | Mitchell | Sept. 7, 1937 |
| 2,221,710 | Johnson | Nov. 12, 1940 |
| 2,671,950 | Sukacev | Mar. 16, 1954 |
| 2,679,031 | Jaidinger | May 18, 1954 |
| 2,757,471 | Vlock | Aug. 7, 1956 |
| 2,825,891 | Duinker | Mar. 4, 1958 |
| 2,846,672 | Hennessey | Aug. 5, 1958 |
| 2,877,540 | Austen | Mar. 17, 1959 |
| 2,878,463 | Austen | Mar. 17, 1959 |
| 2,882,591 | Wallentine | Apr. 14, 1959 |